George G. Vitt, Jr.,
James R. Gaskill, Jr.,
INVENTORS.

George G. Vitt, Jr.,
James R. Gaskill, Jr.,
INVENTORS.

George G. Vitt, Jr.,
James R. Gaskill, Jr.,
INVENTORS.
BY.

ATTORNEY.

United States Patent Office 3,436,589
Patented Apr. 1, 1969

3,436,589
FOCUS MONITOR ARRANGEMENT
James Robbins Gaskill, Jr., Playa Del Rey, and George G. Vitt, Jr., Los Angeles, Calif., assignors to Hughes Aircraft Company, Culver City, Calif., a corporation of Delaware
Filed Jan. 12, 1967, Ser. No. 608,810
Int. Cl. H01j *31/26, 29/56*
U.S. Cl. 315—10
8 Claims

ABSTRACT OF THE DISCLOSURE

A cathode ray tube is provided having an electrically isolated beam limiting plate with an aperture therein interposed between the phosphor screen and second anode of the tube. In tube operation the electron beam is focused at the aperture and in the plane of the limiting plate resulting in a second focused condition at the phosphor screen. Focus occurring at the plane of the phosphor screen results in maximum electron beam intensity and maximum light flux output from the phosphor screen. Alternate monitoring devices are provided to scan the light output or the effective electron beam current. A controlled input is provided to the beam focusing device to periodically defocus the beam and in real time vary the controlled input signal to the focusing device until the optimum focus condition is reached and sensed by one of the monitoring devices. A stop and hold signal is then created at the controlled input. The tube is then conventionally operated until a second focus monitoring signal is instituted.

---

The invention is generally directed to an arrangement to monitor the focus condition of a cathode ray tube and to control tube operation in response to the monitored condition and thereby maintain tube focus. In addition to the arrangement described, the invention structurally teaches a cathode ray tube having unique features.

Cathode ray tubes have attained a wide variety of uses in the electronics industry. Somewhat simplified, the tube comprises a phosphor viewing screen at one aspect, an electronic beam producing cathode at an opposed aspect and means to control the movement of the beam across the phosphor screen and thereby produce, at the screen, a visible representation which may be used to convey intelligence. In virtually all cathode ray tube applications the quality and resolution of the visible pattern displayed directly responds to maintaining the electron beam in a sharply focused condition at the phosphor plane. In one application the cathode ray tube display is used as an end product in radar surveillance systems. The display produces a representation of the physical condition existing over a relatively large geographic area which is being radar surveyed. Thus, the presence or absence of area intruding aircraft or other vehicles or objects may be monitored at a central location. For record purposes the display of the cathode ray tube is frequently recorded on photographic film so a continuous history of the surveyed condition may be maintained. As noted, sharpness and display resolution is a function of beam focus at the tube viewing screen. This is of increased importance when the system incorporates a continuous filmed record of the display. A properly focused display is necessary for accurate film reproduction.

Persons skilled in the cathode ray tube display field will be aware of the fact that focus of the tube responds to a variety of variables. Input voltages to focusing coils and the like may be subjected to drift and other artificial variations due to a wide variety of causes. As input currents and voltages vary, it is obvious that the focus condition of the beam will also vary. For example, it is not uncommon that inputs vary during tube start-up and initial operation. The electrical condition of components varies during warm-up. Thereafter, it is not uncommon that the inputs vary or drift for other reasons, for example, due to a variation in ambient temperature condition. As a result of such variation or drift, the focus condition of the electron beam at the phosphor viewing screen varies with resulting impaired resolution and picture quality.

It is a primary object of the present invention to provide a tube monitoring and feedback arrangement that selectively responds to a defocused beam condition existent within the tube and automatically provides an input correction therefor.

It is a further object of the invention to provide, in the arrangement described, a cathode ray tube having novel structural features which lend themselves to a continuous monitoring of the beam focus condition and provide a mode to initiate correction.

It is a further object of the invention to provide a cathode ray tube of the type described that incorporates a limiting plate arranged in perpendicular relation to the axis of electron beam propagation, said plate having an aperture therein to permit beam motion therethrough in combination with an electrostatic or electromagnetic focusing structure which is operative to optically focus the beam at the noted aperture and at the phosphor viewing screen and thus provide a mode of monitoring the beam focus condition.

It is a further object of the invention to provide a cathode ray tube of the type described wherein equality is established between the maximum light flux output of the display, optimal beam focus condition and minimum beam spot diameter size at the viewing screen.

It is yet a further object of the invention to provide a feedback arrangement which, in alternate embodiments, may be responsive to light flux output of the tube or an electrical condition existing in certain of the tube structural elements which accurately reflects beam focus condition and provides a standard by which a corrective input may be generated to return the beam to optimum focus condition.

These and other features and advantages of the invention will become apparent in the course of the following description and from an examination of the related drawings wherein.

Figure 1:
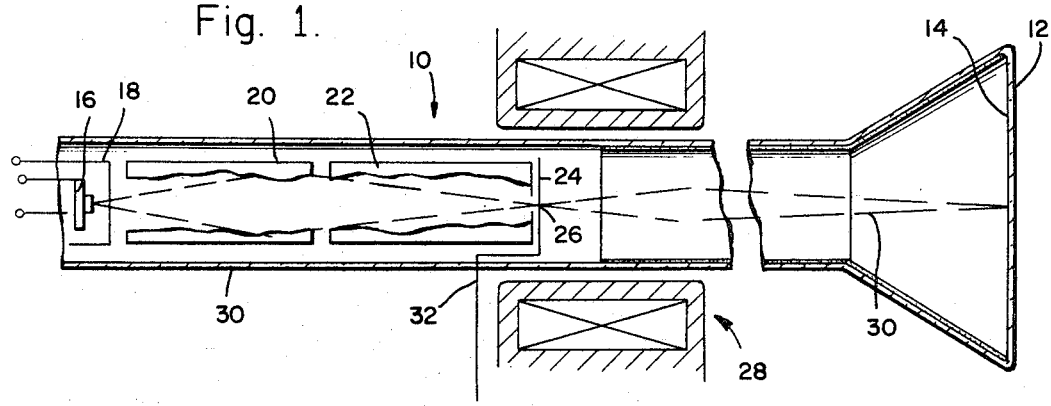
FIG. 1 is a partially schematic vertical cross-sectional view of a cathode ray tube incorporating features of the invention.

Referring to the drawings, FIG. 1 is a partially schematic vertical cross-sectional arrangement of a typical cathode ray tube employing features of the invention. The numeral 10 generally indicates a glass envelope which is gas evacuated and houses a viewing screen 12 at one end aspect, the latter being provided with a luminescent phosphor coating 14 on its inner surface. A heater and cathode structure 16 is positioned at the other end aspect of the tube 10 and serves as the means to create an electron beam used in the tube. A grid 18, a first anode 20 and second anode 22 are positioned in sequence forwardly of the cathode 16. The structure described is conventional and well known to those familiar with this art. Additionally, the second anode 22 is electrically connected with the phosphor coating 14 in any conventional manner as, for example, by coating the inner surface of the tube 10 with a metalized conductor.

The present invention utilizes a beam flow limiting plate 24 positioned forwardly of the second anode 22 and provided with a small geometrically uniform central beam limiting aperture 26. The plate 24 and aperture 26 are more clearly illustrated in the enlarged fragmentary FIG. 2. A focusing arrangement is indicated generally at 28 and surrounds the glass tube 10 in radial relation to the limiting plate 24 and the adjacent end of anode 22. The arrangement 28 may be used to create a beam focusing magnetic field or a beam focusing electrostatic field. In the former case the beam focus responds to the input of a static focus current and in the latter case the beam focus responds to the input of a focus voltage. Both focusing arrangements are generally conventional in the art. The input to either arrangement will hereinafter be termed "focus input."

In normal operation an electron beam which may be indicated by dotted lines 30 is generated by the cathode 16, accelerated and formed by first and second anodes 20 and 22, and is arranged to first focus in the area of the limiting plate 24. Thereafter, the beam again diverges and, under the influence of focusing arrangement 28, is again converged and focused, ideally, at the plane of the phosphor coating 14.

A feature of the present invention is the structure of the cathode ray tube 10. Particularly, the limiting plate 24 is electrically isolated from the other structure within the tube and is provided with a single input electrical lead 32. The focusing arrangement 28 is physically arranged both as to position and focus input so that the electron beam, in its optimum mode of operation, will first focus within the aperture 26 (FIG. 2) and exactly at the plane of the limiting plate 24. Second focus occurs at the phosphor coating 14.

Figure 2:
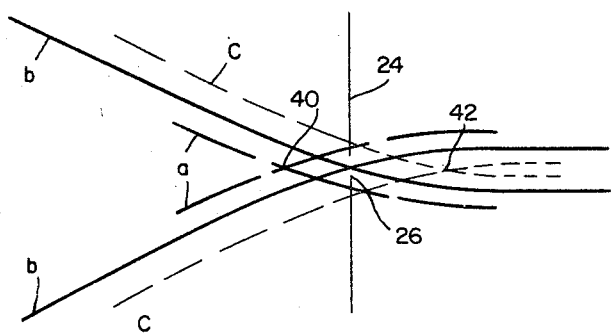
FIG. 2 is a partially schematic sketch of certain beam configurations resulting from the operation of the tube shown in FIG. 1.

Referring to FIG. 2, the lines b, b, are illustrative of a properly focused electron beam at the plane of plate 24. Under these conditions the lines b, b, represent the annular outer physical dimension of the beam and the beam passes through the aperture 26 with minimum interference from plate 24. With the first focus thus arranged in the plane of limiting plate 24 the beam 30 has a second focus at the phosphor screen 14. The second focus produces, at the screen, a minimum diameter spot size and a maximum flux light output. Thus, in this optimum condition, the beam is ideally focused and maximum picture resolution and clarity is achieved.

FIG. 2 also illustrates what generally occurs at the plate 24 when the electron beam is slightly out of focus. For example, phantom lines, a, a, show the beam focus at 40 to the left of plate 24. With the beam thus focused, an annular segment of the plate 24 surrounding opening 26 interrupts a portion of the electron beam and some of the electrons flowing therein are captured by plate 24. Thus, beam current is reduced by the amount of electrons impinging on plate 24. Dotted lines c, c, illustrate a beam focused at point 42 to the right of limiting plate 24. In this condition, the annular segment of the plate 24 surrounding aperture 26 again interrupts a peripheral portion of the beam and collects the electrons located therein. Again, the beam current transmitted through the aperture 26 is lowered.

As noted, both out-of-focus conditions illustrated by lines a, a, and c, c, in FIG. 2, a lowered beam current is passed through plate 24 and engages the phosphor screen 14. The lower current reduces the light intensity at the phosphor screen. Additionally, and due to the fact that the initial focus point of the beam is axially displaced from the plane of plate 24 the beam is likewise not focused at the phosphor screen 14. Accordingly, the spot size of the beam 14 is greatly enlarged over that of the optimum focus condition. It will thus be apparent that in either defocused condition a lower light flux output and an enlarged beam spot size can be expected at the display and impaired resolution and picture quality results.

Figure 3:
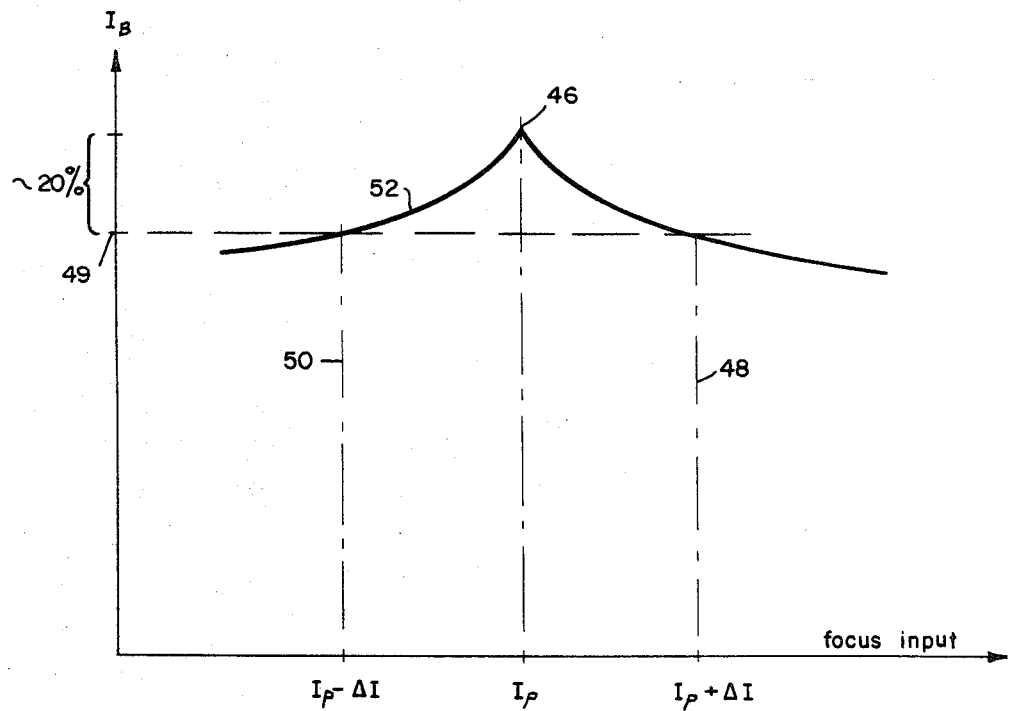
FIG. 3 is a graphical representation of electron beam current vs. static focus current.

FIG. 3 is a graphical representation of effective electron beam current impinging on the phosphor screen 14 in relation to focus input to arrangement 28. With the beam properly focused at the plane of plate 24 and secondarily focused at the phosphor screen 14, a maximum beam current is achieved as represented by the apex 46 of the graph line 52. In the event the focus input to arrangement 28 is too high, and for illustrative purposes we can assume an increase of 20%, such input is represented by line 48. Under these circumstances the effective electron beam current has been reduced approximately 20%, i.e., point 49 on the graph.

In the event the focus input in the structure 28 is reduced by an equivalent 20%, which may be graphically represented by line 50, again the effective beam current impinging on the phosphor is also reduced by an approximate 20% amount, i.e., point 49. Thus, either too high or too low a focus input to focus arrangement 28 produces an identically defocused condition at the phosphor screen, namely, beam spot size, reduced beam current and reduced light flux output. It is noted, however, that the curve 52 slopes in different directions depending upon whether the focus input is too high or too low. The ideal focus input, of course, is at the point of changeover of focus current slope from a positive to a negative direction.

Figure 4:
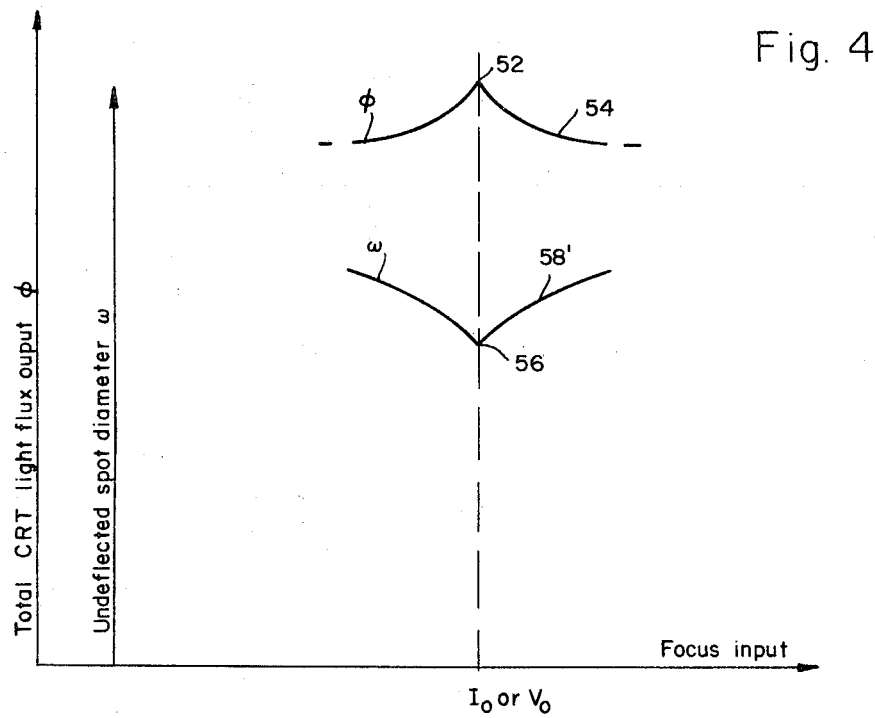
FIG. 4 is a graphical representation of the variation in cathode ray light flux output and diameter spot size in relation to the variation in focus input control.

Graph FIG. 4 is illustrative of the end result described above. The abscissa of the graph is focus input to the focusing arrangement 28 while the first ordinate represents light flux output and the second ordinate undeflected spot size diameter. It will be noted that when the focusing input is at its optimum point, there is a maximum flux output as illustrated by the apex 52 on graph line 54. An increase or decrease in focus input causes a proportional decrease in light flux output. Likewise, the spot size diameter on the phosphor screen 14 is minimum as indicated by reverse apex 56 on graph line 58, this condition occurring at optimum focus input. A departure of focus input from optimum increases the spot diameter size in direct proportion to the degree of departure.

Figure 5:
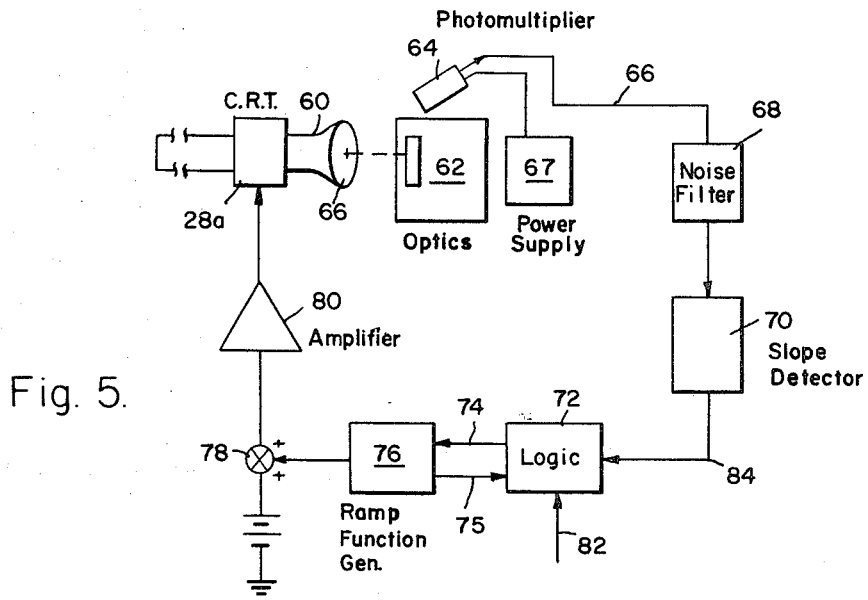
FIG. 5 is a schematic arrangement of monitoring arrangement of one mode of practicing the invention.

FIG. 5 illustrates a first mode of providing an arrangement to continuously monitor and constantly provide a focus input correction to maintain optimum focus condition at the viewing screen of the tube. A typical cathode ray tube is indicated by the numeral 60. A photographic filming arrangement is shown by box 62. Any light sensitive device such as a conventional photomultiplier tube 64 may be employed having its sensitive face arranged to survey the display face 66 of the tube. A power supply 67 may be provided to energize tube 64. The output of the photomultiplier tube is directly proportional to the total amount of light flux received thereby. Its output circuit is indicated by line 66 and includes, in series, a noise filter 68, slope detector 70 and a logic system 72. The logic system 72 is electrically connected as at 74, 75 with a ramp function generator 76, the output of the latter going to a conventional summing point 78 and then to amplifier 80 and to the focusing arrangement 28a. Reference voltage is provided by source 77 and normally provides the focus input to arrangement 28a. An external timing signal is represented by line 82 and communicates with the logic system 72. The timing signal may be from any independent source as, for example, from an arrangement controlling the sequential operation of the cathode ray tube 60. Thus, it will be understood, in this aspect of the focus monitoring and correcting arrangement, the external circuitry described is energized periodically by the timing signal.

Figure 5A:
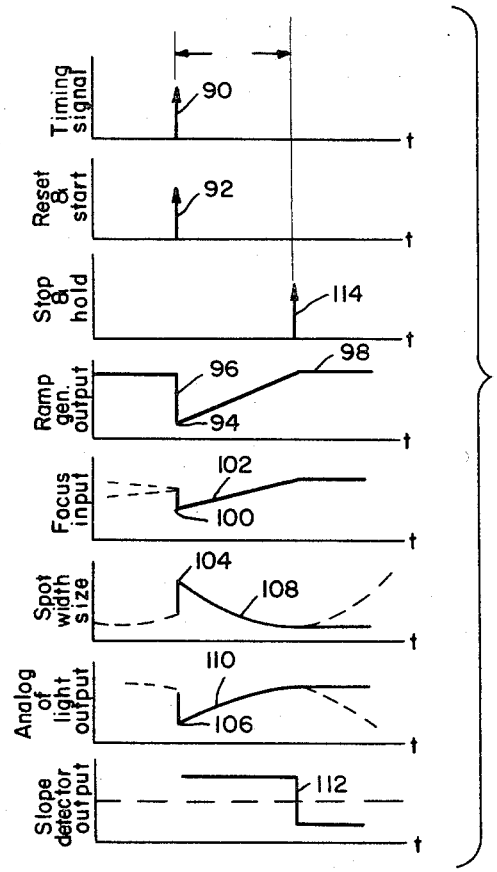
FIG. 5a is a multiple composite graphic illustration of operating variables illustrating the function of the structure shown in FIG. 5.

The multiple graphs of FIG. 5a illustrate the operation of the described external circuitry in relation to a common time abscissa. For this reason, the several graphs of FIG. 5a are arranged vertically above one another so that their equally incremented time abscissas may be vertically aligned. At an appropriate instant, timing pulse, as indicated by line 90, FIG. 5a, is received by the logic system 72 of FIG. 5. An input signal is continuously being received from the photomultiplier tube 64 as a result of continuous monitoring of the light flux output from face 66 of tube 60. This signal varies in intensity with the intensity of the light flux received. Upon the concurrent reception in the system 72 of the timing signal and photomultiplier signal, a reset and start signal 92 is generated which is transferred via line 74 to ramp function generator 76. Upon energizing, the ramp function generator drops to an output as indicated by point 94 which is below any focus input to focusing arrangement 28a to which it would normally drift in the time increment between monitoring pulses. Thus, an artificial out-of-focus condition is created. The ramp function generator output continuously rises, as shown by line 96 during the determined time increment, to a point 98 which is slightly above the optimum focus input to the focusing arrangement 28a. Since the ramp function generator is algebraically added to the input supply to the focusing arrangement 28a, the focus input will fall to point 100 and continuously rise as indicated by line 102 during the illustrated time increment. Concurrently with the described sequence, the spot width at tube 64 will enlarge as shown by point 104, FIG. 5a, due to the intentional defocusing input at arrangement 28a. Additionally, the light output at display face 66, being monitored by tube 64, will fall as shown by point 106 in FIG. 5a. During the generator rise of focus input to arrangement 28a, the spot width continuously narrows with time as shown by line 108 while the light output becomes increasingly brighter as shown by line 110, both of FIG. 5a, because an approaching focus condition is being achieved.

It will be recalled that as the maximum focus condition is achieved, the light output at the display face reaches maximum intensity and then reduces in intensity as the focus input is increased beyond the optimum point. In effect, though the intensity diminishes on both sides of optimum focus input, the direction of slope changes abruptly from positive to negative. With this in mind, the output of the slope detector 70 changes sharply from positive to negative as indicated by line 112 as optimum focus condition is passed. Upon receipt by logic system 72 of the variation of the output of detector 70 from positive to negative an impulse is then generated which transmits a stop and hold signal via line 75. The stop and hold signal is transmitted to the ramp function generator 76 and its output rise is halted. Thus, a proper focus condition by controlling the focus input to the focusing arrangement 28a is achieved. This desired end result may be initiated repeatedly at any desired time cycle. In effect, the result is achieved by artificially introducing a determined defocused condition to the cathode ray tube and time gradient correction the artificially defocused condition to a properly focused condition before re-initiating tube operation.

Figure 6:
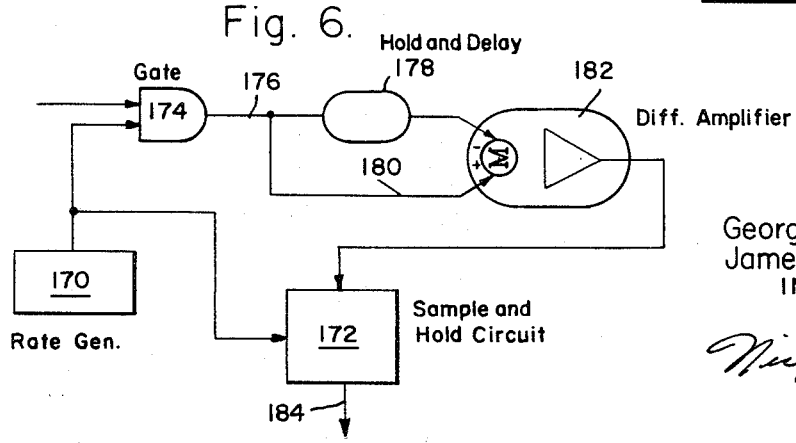
FIG. 6 is a circuit arrangement of one possible implementation of the slope detection arrangement incorporated in the structure of FIG. 5.

FIG. 6 represents a typical circuit to implement the slope differentiator 70 described with reference to FIG. 5. The numeral 170 indicates a repetition rate generator which provides the sampling signal to the circuit to be described. The generator 170 periodically pulses at a rate which is substantially more rapid than the time which represents the focusing period time lapse. A sample and hold circuit 172 is provided, the output of which provides the input to the logic system 72. Upon pulsation by the generator 170, the sample and hold circuit is energized and a sampling gate 174 is opened to receive a cycle pulse from the photomuliplier tube 64. The cycle pulse admitted by the gate 174 is carried via line 176 to a one-cycle hold and delay device 178. A second pulse from the repetition rate generator admits another sample signal via gate 174 which is carried via line 176 and 180 to a differential amplifier indicated at 182. Concurrently with the admission of the second pulse to the amplifier 182 via line 180, the one-cycle delay device 178 admits the held cycle pulse to the differential amplifier 182 and both pulses are algebraically summed within the amplifier. The output of the amplifier 182 may be either positive or negative depending upon the sign of the algebraically summed pulses. If positive, it is apparent that the apex 52 (FIG. 4) of maximum light flux output has not been reached. The sample and hold circuit functions to retain each signal received from the differential amplifier 182 between sampling pulses. Following the sampling period during which the input to the sample and hold circuit changes from plus to minus the sign of its output changes abruptly from positive to negative. This occurs when the differential amplifier output which in fact represents the slope of the curve 54 in FIG. 4 abruptly changes from positive to negative. When this change is received at the sample and hold circuit 172, an output pulse via line 184 is sent to logic system 72 which in turn initiates the stop and hold circuit of the ramp function generator 76. Thus, a new focus input is created and carried to the focusing arrangement 28a. The image now appearing at the face 66 of the cathode ray tube 60 is in focus for its next operational sequence. Again, and as noted above, the focus monitoring may be time repeated at any desired interval.

Figure 7:
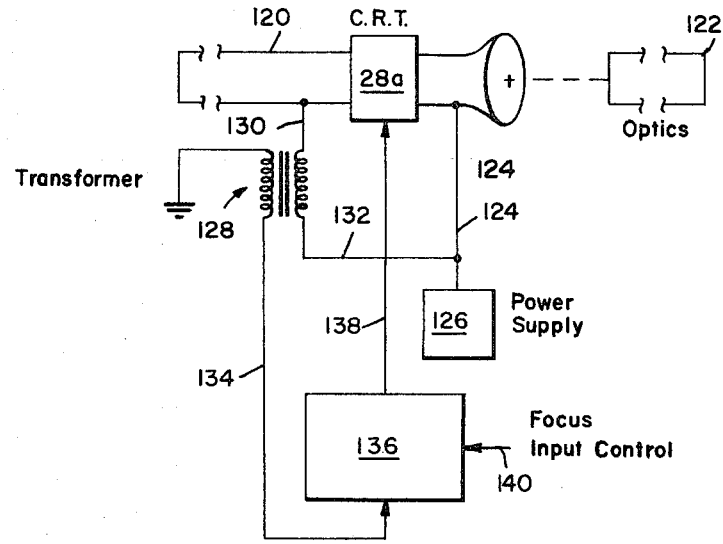
FIG. 7 is a partially schematic and circuit arrangement illustrating an alternate mode of practicing the invention.
Figure 8:
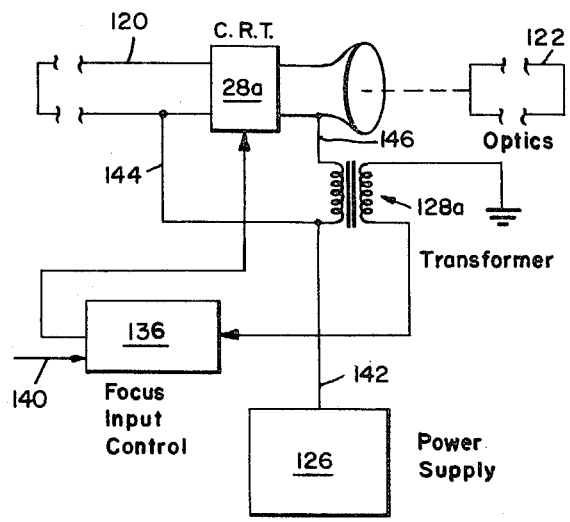
FIG. 8 is a view similar to FIG. 7 illustrating yet another mode of practicing the invention.

FIGS. 7 and 8 illustrate alternate embodiments to accomplish focus monitoring of the cathode ray tube without employing continuous surveillance of the light flux output of the tube. The numeral 120 in FIG. 7 illustrates the cathode ray tube being monitored and the numeral 122 is diagrammatic of any main optical system, here, to continuously photograph the display of the tube. A first line 124 is electrically connected to the second anode (FIG. 1) and a high voltage power supply 126 is provided. A high voltage isolation and current transformer is indicated at 128 and is connected by lead 130 to the electrically isolated limiting aperture plate described with reference to FIG. 1 at numeral 24. One lead of the power supply 126 is connected as at 132 to the transformer 128 while an output side of the transformer 128 is connected as at 134 to the focus input control indicated at 136. The output of the input control 136 is connected via line 138 to the focus control arrangement 28a. In the conventional operating mode, the output voltage line 134 of transformer 128 is directly responsive to the slope of the curve representing the input current signal from aperature plate 24. The current at the plate reaches a minimum at the electron beam focus condition and thereafter the slope of the curve representing the input signal at plate 24 abruptly changes from positive to negative. The signal representing this change is carried to the focus input control 136. The control 136 duplicates the logic system 72, ramp function generator 76 summing point 78 and amplifier 80 of the FIG. 5 embodiment. Accordingly, a new focus input is created and delivered to arrangement 28a and the in-focus condition of tube 120 reestablished. Thus, in this embodiment, focus monitoring occurs at limiting aperture plate 24. The monitoring cycle, of course, may be repeated at the desired interval.

FIG. 8 is a slightly modified arrangement similar to that of FIG. 7 except that the focus monitoring point is the phosphor screen and connected structure such as the second anode. Structure identical with FIG. 7 is shown by identical numerals. Power supply 126 is connected to line 142 to isolation and current transformer 128a and to limiting aperture plate 24 via lead 144. Line 146 connects phosphor screen and second anode to the input side of transformer 128a. The output of transformer 128a goes to focus input 136 and the latter connects to focus arrangement 28a via line 150. As in the embodiment of FIG. 7, as the output of the transformer 128a registers a change in the slope of the monitored beam current an input is provided to the focus control to initiate a stop and hold pulse to the ramp function generator which provides the proper focus output to arrangement 28a to focus the tube 120. In this embodiment monitoring occurs at the phosphor screen and the monitoring cycle may be repeated at any desired interval.

The invention is shown by way of illustration and may be modified in many particulars all within the spirit and scope thereof.

What is claimed is:

1. In a focus monitoring arrangement for a cathode ray tube,
    said tube including electron beam emission means and a phosphor screen to provide a visible display in response to beam impingement thereon,
    said tube having a plate with a limiting aperture located in the electron beam path,
    focus means to first focus the electron beam at the plane of the plate and in the aperture formed therein,
    said focus means being operative to second focus the beam at the phosphor viewing screen,
    said focus means being responsive to a focus input signal,
    the focus at the phosphor viewing screen being operative to produce maximum light flux output at said screen, and
    monitoring means to survey the intensity of the beam and vary the focus input signal to the focus means in response to beam intensity variation and thereby control the positioning of the first and second focus of the beam at the aperture and phosphor screen, respectively.

2. A focus monitoring arrangement according to claim 1, wherein said monitoring means comprises variable means to change the focus input signal to the focus means to a determined level,
    said variable means being operative to thereafter vary the intensity of said focus input signal through an intensity range and during a determined time increment.

3. A focus monitoring arrangement according to claim 2 wherein said monitoring means further comprises a light flux sensitive device aligned with the phosphor viewing screen to receive light flux emitted therefrom,
    and means responsive to a determined variation of the received light flux to fix said focus input signal at a level to effect said positioning control.

4. A focus monitoring arrangement according to claim 2, wherein said monitoring means further comprises means to survey a signal level at said plate,
    and means responsive to a determined variation of the surveyed signal level at said plate to fix said focus input signal at a level to effect said positioning control.

5. A focus monitoring arrangement according to claim 2, wherein said monitoring means further comprises means to survey a signal level at said phosphor screen,
    and means responsive to a determined variation of the surveyed signal level to fix said focus input signal at a level to effect said positioning control.

6. A focus monitoring arrangement according to claim 3, wherein the variation in received light flux which fixes said focus input signal is the transition of said flux through its point of maximum flux intensity.

7. A focus monitoring arrangement according to claim 4, wherein the variation in said surveyed signal level is the transition of said signal level through its point of minimum intensity.

8. A focus monitoring arrangement according to claim 5, wherein said variation in said surveyed signal level is the transition of said signal level through its point of maximum intensity.

References Cited
UNITED STATES PATENTS

| | | | |
|---|---|---|---|
| 2,472,165 | 6/1949 | Mankin | 315—31 |
| 2,701,850 | 2/1955 | Blayney | 315—10 |
| 2,880,358 | 3/1959 | Parker | 315—31 |
| 3,084,276 | 4/1963 | Severin | 315—31 X |
| 3,331,985 | 7/1967 | Hamann | 315—31 X |
| 3,333,144 | 7/1967 | Bulk | 250—202 X |

RODNEY D. BENNETT, JR., *Primary Examiner.*

MALCOLM F. HUBLER, *Assistant Examiner.*

U.S. Cl. X.R.

315—31